US012640448B2

(12) United States Patent
Gonoji

(10) Patent No.: US 12,640,448 B2
(45) Date of Patent: May 26, 2026

(54) BATTERY CASE STRUCTURAL BODY

(71) Applicant: AISIN KEIKINZOKU CO., LTD., Imizu (JP)

(72) Inventor: Takumi Gonoji, Imizu (JP)

(73) Assignee: AISIN KEIKINZOKU CO., LTD. (JP)

( * ) Notice: Subject to any disclaimer, the term of this patent is extended or adjusted under 35 U.S.C. 154(b) by 618 days.

(21) Appl. No.: 18/306,579

(22) Filed: Apr. 25, 2023

(65) Prior Publication Data

US 2023/0344095 A1 Oct. 26, 2023

(30) Foreign Application Priority Data

Apr. 26, 2022 (JP) ................................. 2022-072053
Mar. 21, 2023 (JP) ................................. 2023-044807

(51) Int. Cl.
| | |
|---|---|
| *H01M 50/553* | (2021.01) |
| *H01M 50/209* | (2021.01) |
| *H01M 50/244* | (2021.01) |
| *H01M 50/264* | (2021.01) |
| *H01M 50/289* | (2021.01) |
| *H01M 50/291* | (2021.01) |
| *H01M 50/548* | (2021.01) |

(52) U.S. Cl.
CPC ....... *H01M 50/553* (2021.01); *H01M 50/209* (2021.01); *H01M 50/244* (2021.01); *H01M 50/264* (2021.01); *H01M 50/289* (2021.01); *H01M 50/291* (2021.01); *H01M 50/548* (2021.01)

(58) Field of Classification Search
CPC ....... H01M 50/50–517; H01M 50/244; H01M 50/264; H01M 50/209; H01M 50/291; H01M 50/543–50/567; H01R 13/518; H01R 13/42; H01R 13/436; H01R 4/58
See application file for complete search history.

(56) References Cited

U.S. PATENT DOCUMENTS

2018/0315979 A1* 11/2018 Ryu ..................... H01M 50/548
2020/0358051 A1* 11/2020 Dawley ................... B60L 50/64

FOREIGN PATENT DOCUMENTS

JP 2009-170687 A 7/2009

* cited by examiner

*Primary Examiner* — Susan D Leong
*Assistant Examiner* — Timothy G Hemingway
(74) *Attorney, Agent, or Firm* — Harness, Dickey & Pierce, P.L.C.

(57) ABSTRACT

A battery case structural body includes: two terminal members arranged at both ends of a battery; and a case body that holds the battery. The two terminal members includes two engaging parts, each of which is provided to each terminal member. The case body includes: an accommodating part including a frame and accommodating the battery that is downwardly embedded into the frame from above; two end openings, each of which is formed so as to cut at least upper part of the frame and exposes at least a part of each of the two terminal members arranged at both ends of the battery accommodated in the accommodating part; and two engaged parts engaged with the two engaging parts of the two terminal members.

15 Claims, 10 Drawing Sheets

BATTERY CASE STRUCTURAL BODY

CROSS REFERENCE TO RELATED APPLICATIONS

This application is based upon and claims the benefit of priority to Japanese Patent Applications No. 2022-072053 filed on Apr. 26, 2022 and No. 2023-044807 filed on Mar. 21, 2023, the entire contents of which are incorporated herein by reference.

BACKGROUND OF THE INVENTION

The present invention relates to a battery case used for mounting a battery in an electric vehicle, a hybrid vehicle, or the like.

Since a battery mounted as a driving source of a vehicle has a high voltage, a rechargeable battery such as a battery module in which a plurality of battery cells is stacked is adopted.

In this case, the battery is embedded into a battery case body while both ends of the stacked battery cells are sandwiched and restrained by jigs, to thereby restrain and hold the battery to this battery case body.

The plurality of battery cells embedded in the battery case body is electrically connected using a busbar or the like.

For example, Japanese Patent Laid-Open No. 2009-170687 discloses a battery case that restrains and holds both ends of a battery by a thermal conductive pressurizing rubber 5 and a spring 9.

When the battery is embedded into the battery case while both ends of the plurality of stacked battery cells are restrained by restraining jigs, it is necessary to avoid interference between restraining parts of the restraining jigs and end walls of the battery case.

For example, exemplifying FIG. 1 in Japanese Patent Laid-Open No. 2009-170687, when the plurality of battery cells is sandwiched by the restraining jigs via both ends of the battery cells, and is embedded into a metal housing 1, it is necessary to secure a space such that the restraining parts of the restraining jigs do not interfere with sidewalls on the end side of the metal housing 1.

Hence, in the related art, the upper parts of both ends of the battery are restrained and held by the arm-shaped restraining jigs to embed the battery into the battery case from the lower parts of both ends of the battery. This causes a problem that workability becomes poor. In addition, this also causes a problem that the subsequent welding work or fastening operation of the busbar or the like cannot be started unless the restraint jigs are retracted after the battery is assembled in the battery case.

DETAILED DESCRIPTION

Figure 1:
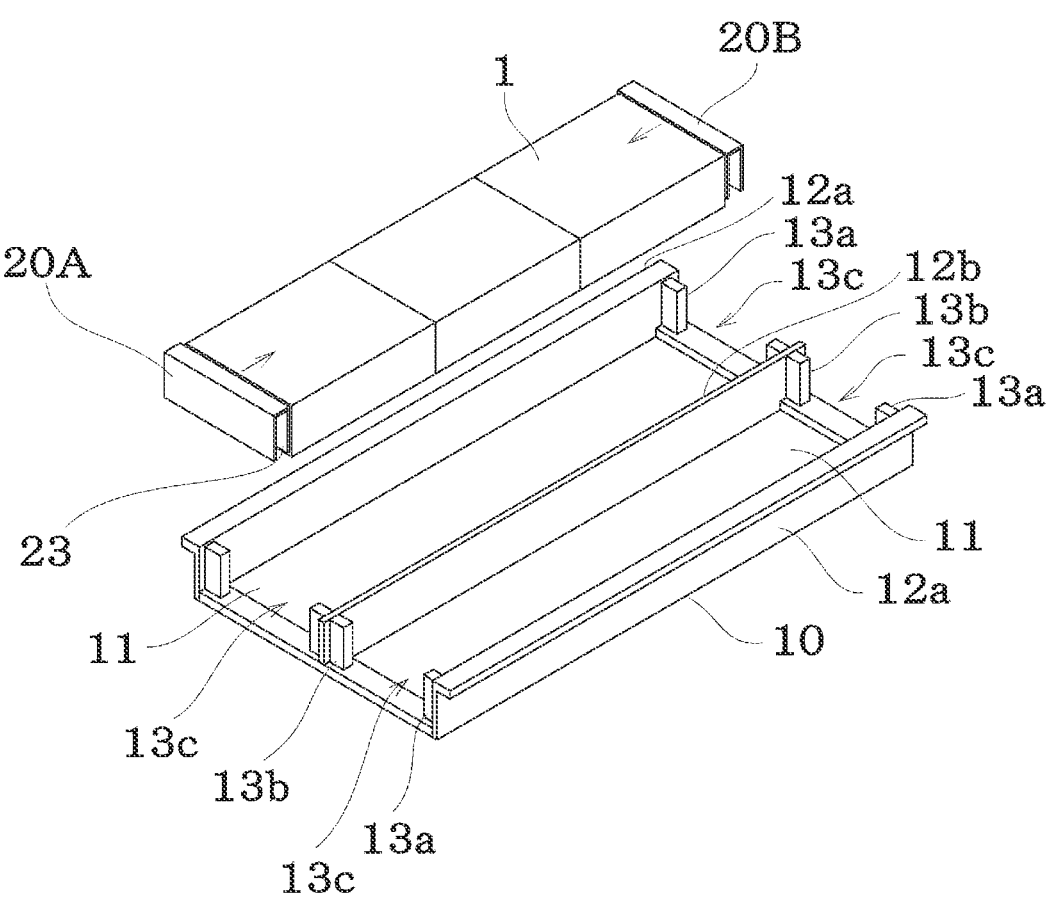
FIG. 1 illustrates a structure example (Example 1) of a battery case structural body according to the present disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

The present disclosure has an object to provide a battery case structural body excellent in workability of embedding a battery into a battery case.

In accordance with one of some embodiments, there is provided a battery case structural body comprising:

two terminal members arranged at both end of a battery; and a case body that holds the battery, the two terminal members including two engaging parts, each of which is provided to each terminal member, the case body including:

an accommodating part including a frame and accommodating the battery that is downwardly embedded into the frame from above;

two end openings, each of which is formed so as to cut at least upper part of the frame and exposes at least a part of each of the two terminal members arranged at both ends of the battery accommodated in the accommodating part; and two engaged parts engaged with the two engaging parts of the two terminal members.

As a result, in some embodiments, in a state in which the two terminal members are arranged at both ends of the battery, these two terminal members are sandwiched by the restricting parts of the restraining jigs to restrain the battery therebetween and accommodate the battery into the case body; and at the same time, the engaging parts provided to the terminal members can be engaged with the engaged parts provided to the case body, to thereby fix the battery to the case body. In this case, the case body is formed with the end openings such that the restraining jigs do not interfere with the case body.

In the related art, it is required to secure a space for the restraining jigs to insert both ends of the battery into the battery case from the lower part thereof while the upper parts of both ends of the battery are held by the restraining parts of the restraining jigs. To the contrary, one of some embodiments does not require such a space, and it is possible to engage the engaging parts of the two terminal members with the engaging parts of the case body while the battery is restrained by the restraining jigs via the two terminal members. Accordingly, it is unnecessary to restrain both ends of the battery from the upper part thereof as in the related art, and flexibility in the position and orientation of holding the battery by the restraining jigs is enhanced.

For example, by restraining and holding the battery in the lateral direction by the restraining jigs, it is possible to continuously perform the fixing work of a busbar in the subsequent process from the upper part of the battery formed of a plurality of stacked battery cells.

In the present disclosure, there is no limitation on the engagement structure as long as the battery can be engaged with and held to the case body while the battery is restrained at the two terminal members arranged at both ends of the battery using the restraining jigs.

In accordance with one of some embodiments, there is the battery case structural body, wherein each of the two end openings may be formed across a width wide enough to avoid interference between the case body and jigs that sandwich, from both sides, the two terminal members arranged at both ends of the battery when the battery is loading into the case body.

With this configuration, because of the presence of the end openings that allow movement of the restraining jigs from above, the battery can be engaged with and held to the case body as it is while the battery is restrained by the restraining jigs via the two terminal members arranged at both ends of the battery.

There is no limitation on the material of the case body and or the terminal members.

However, in accordance with one of some embodiments, there is provided the battery case structural body, wherein each of the two engaging parts may be an engaging recess having an opening facing downward, and each of the two engaged parts may be an engaged projection that is engaged with the engaging recess. This configuration exerts the following effects.

By producing the case body formed of a casted member through die-casting or the like, flexibility in three-dimensional shape becomes enhanced, and it is possible to integrally form the end openings and the engaged projections.

In particular, through casting, it is also possible to form the end openings by notching both ends of the case body, and to form the engaged projections to project and face the end openings. On the other hand, the terminal members, each having a cross-sectional channel shape or hook shape, can be produced by extruded members through extruding. Since the pair of terminal members have openings facing downward, both ends of the battery can be directly fitted and locked to the engaged projections of the case body from above.

When the terminal members are formed of extruded members of an aluminum alloy or the like and the case body is formed of a casting material of an aluminum alloy or the like, the extruded members are more excellent in heat dissipation; therefore, the heat dissipation of the battery is enhanced.

In accordance with one of some embodiments, there is provided the battery case structural body, wherein an elastic member may be interposed between the battery and at least one of the two terminal members. With this configuration, for example, in the case of the battery formed of a plurality of stacked battery cells, the plurality of battery cells can be pressed and held by the elastic member.

In accordance with one of some embodiments, there is provided the battery case structural body, wherein an elastic member may be interposed between the battery and at least one of the two terminal members, and the at least one of the two terminal members may be formed with a pressing member that locally presses the elastic member. With this configuration, the pressing member that locally presses the elastic member can be integrally formed with the terminal member formed of the extruded material.

In the battery case structural body according to the present disclosure, since each end of the case body is formed with the end opening in a notch-shape, for example, it is possible to embed the battery downward into the case body from above, while both ends of the battery are held by the restraining jigs via the pair of terminal members; therefore, the embedding workability becomes excellent.

Exemplary embodiments are described below. Note that the following exemplary embodiments do not in any way limit the scope of the content defined by the claims laid out herein. Note also that all of the elements described in the present embodiment should not necessarily be taken as essential elements.

Figure 2:
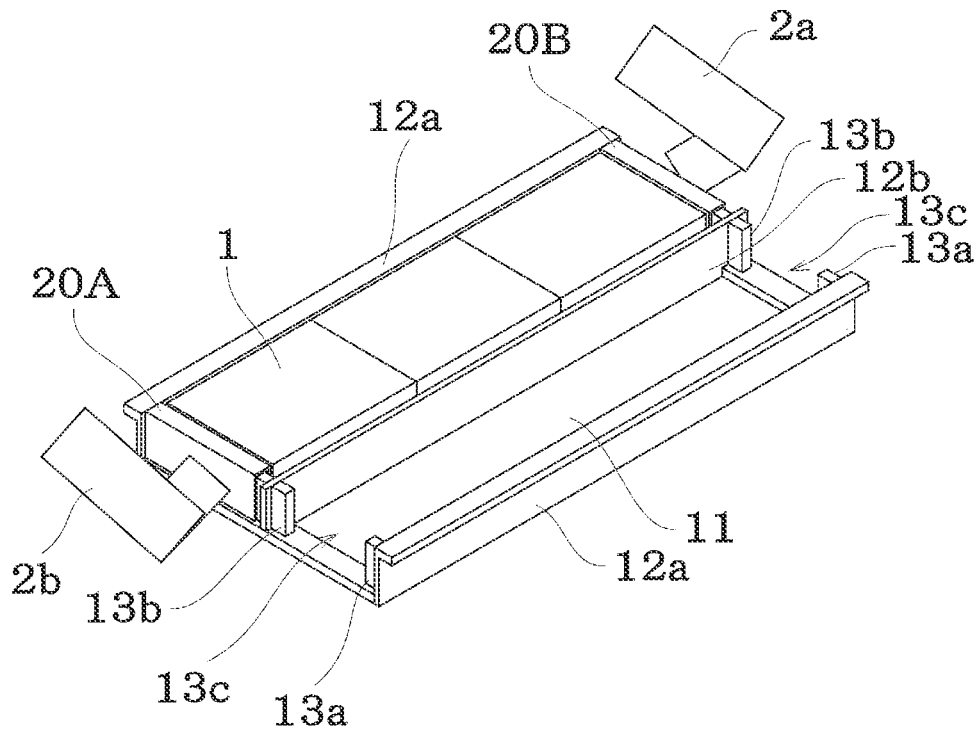
FIG. 2 illustrates a state in which a battery is held by restraining jigs, and is embedded into a case body.
Figure 3:
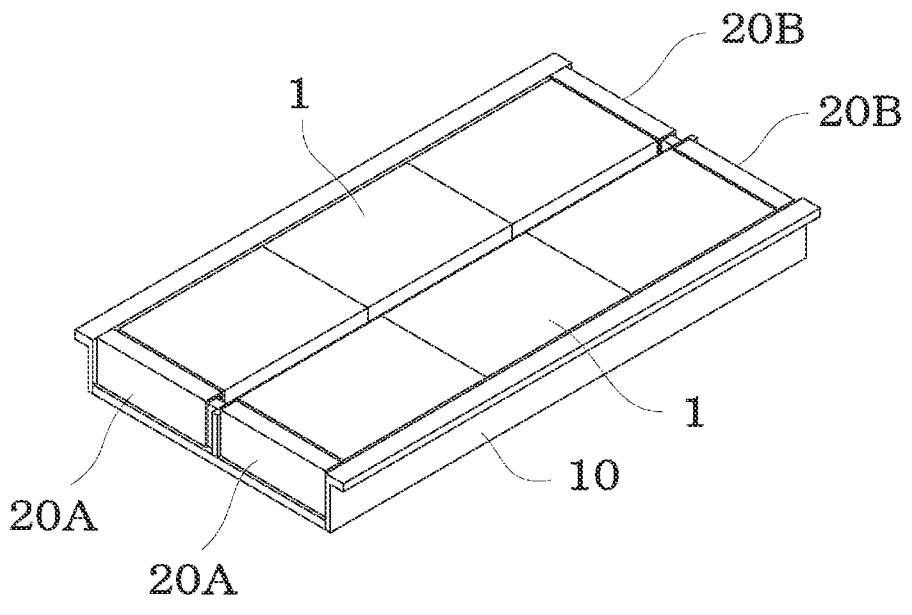
FIG. 3 illustrates an example in which battery modules in two rows are embedded in the case body.

FIG. 1 illustrates an example structure (Example 1) of the battery case structural body according to the present disclosure, FIG. 2 illustrates the embedding work by using restraining jigs, and FIG. 3 illustrates a state after the embedding.

The battery case structural body includes: two terminal members 20A, 20B arranged at both ends of a battery 1; and a case body 10 that holds the battery 1. In the present embodiment, it is exemplified that the case body 10 is produced by using a casted member formed by die-casting an aluminum alloy, and the terminal members 20A, 20B are produced by using an extruded member of an aluminum alloy; however, there is no limitation on the material or the producing method thereof. The two terminal members 20A, 20B may be fixed to both ends of the battery 1, may be temporarily attached thereto, or may not be fixed to the battery 1. The two terminal members 20A, 20B may be disposed at both ends of the battery 1 at least while being restrained by restraining members or while the battery 1 is accommodated in the case body 10.

Accommodating parts 11 of the case body 1 includes a frame and accommodates the battery 1 that is downwardly embedded into the frame from above. The case body 10 in the present embodiment is exemplified that the accommodating parts 11 are formed at two places by arranging a pair of sidewalls 12a, 12a on both sides and a partition wall 12b located in the middle of the sidewalls so as to accommodate the battery 1 such as battery modules in two rows; however, the number of accommodating parts is not particularly limited.

The case body 10 has notch-shaped end openings 13c by cutting end walls of the frame located at both ends of the battery 1 to be accommodated in the accommodating parts 11, each having an upper part that is opened. In Example 1, the walls of the frame are not provided at positions facing both ends of the battery 1 in the longitudinal direction.

Each of the end openings 13c is formed with engaged parts 13a, 13b that can be engaged with engaging parts 23 described later of the terminal members 20A, 20B.

In the present embodiment, the four end openings 13c in total each include an engaged part 13a inward of the sidewall 12*a* and an engaged part 13*b* inward of the partition wall 12*b* that are formed at two positions of each end opening, each of the engaged parts being formed in a projecting shape.

These engaged parts 13*a*, 13*b* are integrally formed with the case body 1 during the die-casting of the case body 1.

In addition, in the case in which the end walls are formed through casting without forming the end walls with the end openings 13*c*, a draft angle oriented upward might be required; however, it is unnecessary to provide such a draft angle in the present embodiment because of having no end walls. Note that it is sufficient that the end opening 13*c* is formed across a width wide enough to avoid interference between the case body 10 and the jigs that sandwich the terminal members 20A, 20B arranged on both ends of the battery 1, from both sides. Therefore, the case body 10 may partially have end walls.

Figure 4:
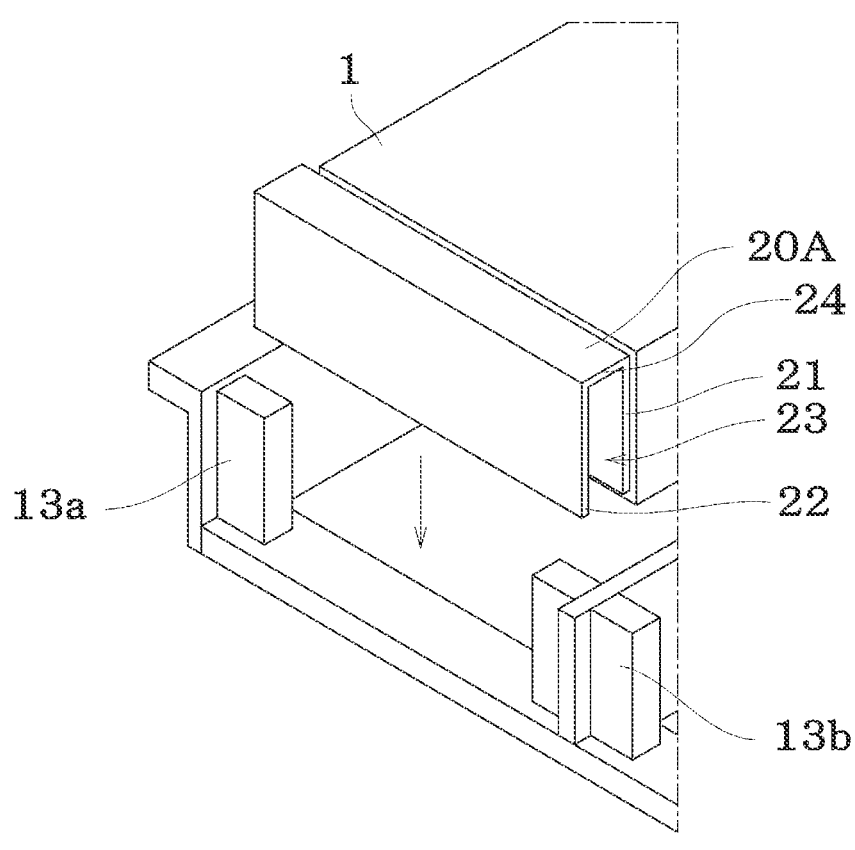
FIG. 4 illustrates an enlarged view of an end of the case body and a terminal member of the case body.

The terminal members 20A, 20B in the Embodiment 1 are each formed to have a substantially channel-shaped cross section including a pair of first and second sidewalls 21, 22 facing each other in the longitudinal direction of the battery 1 and a top wall 24 which connects the first and second sidewalls 21, 22, as illustrated in an enlarged view of FIG. 4. The first sidewall 21 is substantially the same length as the second sidewall 22. Accordingly, the terminal members 20A, 20B are each formed to have a substantially channel-shaped cross section. These terminal members 20A, 20B can be formed of extruded members of an aluminum alloy or the like. Each of the engaging parts 23 provided to the terminal members 20A, 20B is an engaging recess having a downward opening.

To accommodate the battery 1 into the case body 10, as illustrated in FIG. 4, first, both ends of the battery 1 are held and restrained by being pressed by restraining jigs 2*a*, 2*b* via the pair of terminal members 20A, 20B. As illustrated by an arrow in FIG. 4, the battery 1 is oriented downward from above by the restraining jigs 2*a*, 2*b*, and is accommodated into the case body 10, and at the same time, the engaged parts 13*a*, 13*b* are brought to come engagement with the engaging part 23.

At this time, as illustrated in FIG. 2, the end walls of the case body 10 are formed with the cut-out shaped end openings 13*c*; therefore, the restraining jigs 2*a*, 2*b* are not required to sandwich and hold the battery 1 from above, but can sandwich and hold the battery 1 in the lateral direction. Accordingly, the battery 1 including a plurality of stacked battery cells is opened upward, which allows the subsequent step of busbar welding work to be continuously performed.

Figure 5:
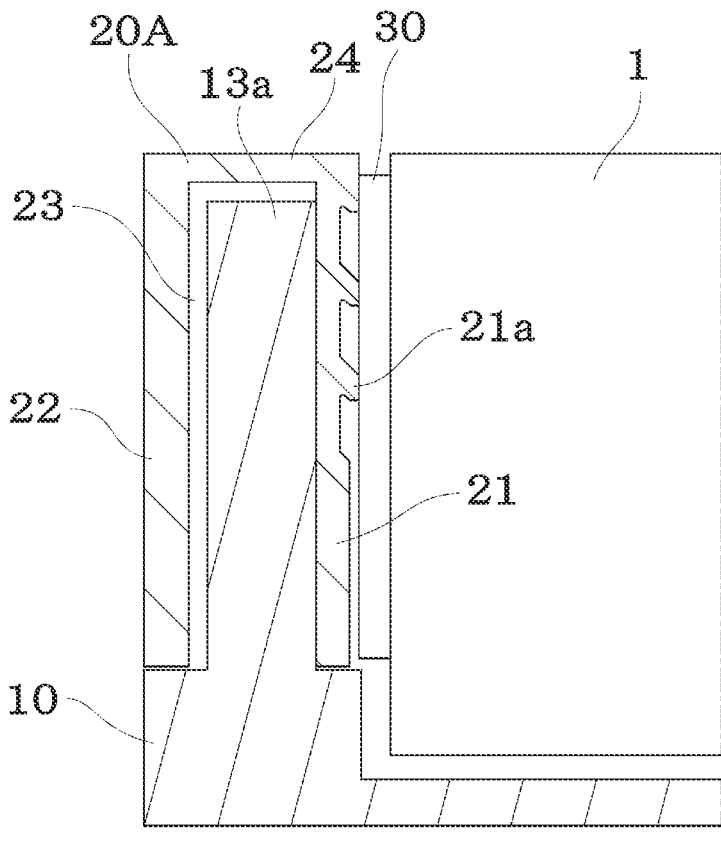
FIG. 5 illustrates a cross-sectional view of the end holding the battery by the terminal member.

Moreover, as illustrated in a cross-sectional view of FIG. 5, an elastic member 30 such as rubber sheet can be interposed between at least one of the two terminal members 20A, 20B (terminal member 20A in FIG. 5) and the end of the battery 1. With this configuration, it is possible to press and hold the battery 1 including a plurality of stacked battery cells by the two terminal members 20A, 20B. In this case, the terminal members 20A, 20B formed by the extruded members may be integrally formed with pressing pieces 22*a* that locally press the elastic member 30.

The extruded member of an aluminum alloy has a higher thermal conductivity than that of the case body of the casted member made of an aluminum alloy; therefore, heat dissipation property of heat generated from the battery is also enhanced.

FIGS. 6 to 9 illustrates an Embodiment 2. The terminal members 120A, 120B in the Embodiment 2 are each formed to have a substantially hook-shaped cross section. Each of the terminal members 120A, 120B includes a pair of first and second sidewalls 121, 122 facing each other in the longitudinal direction of the battery 1 and a top wall 124 which connects the first and second sidewalls 121, 122, as illustrated in an enlarged view of FIG. 9. The second sidewall 122 is shorter than the first sidewall 121. Accordingly, the terminal members 120A, 120B are each formed to have a substantially hook cross section. These terminal members 120A, 120B can be formed of extruded members of an aluminum alloy or the like. Each of the engaging parts 123 provided to the terminal members 120A, 120B is an engaging recess having a downward opening.

Figure 6:
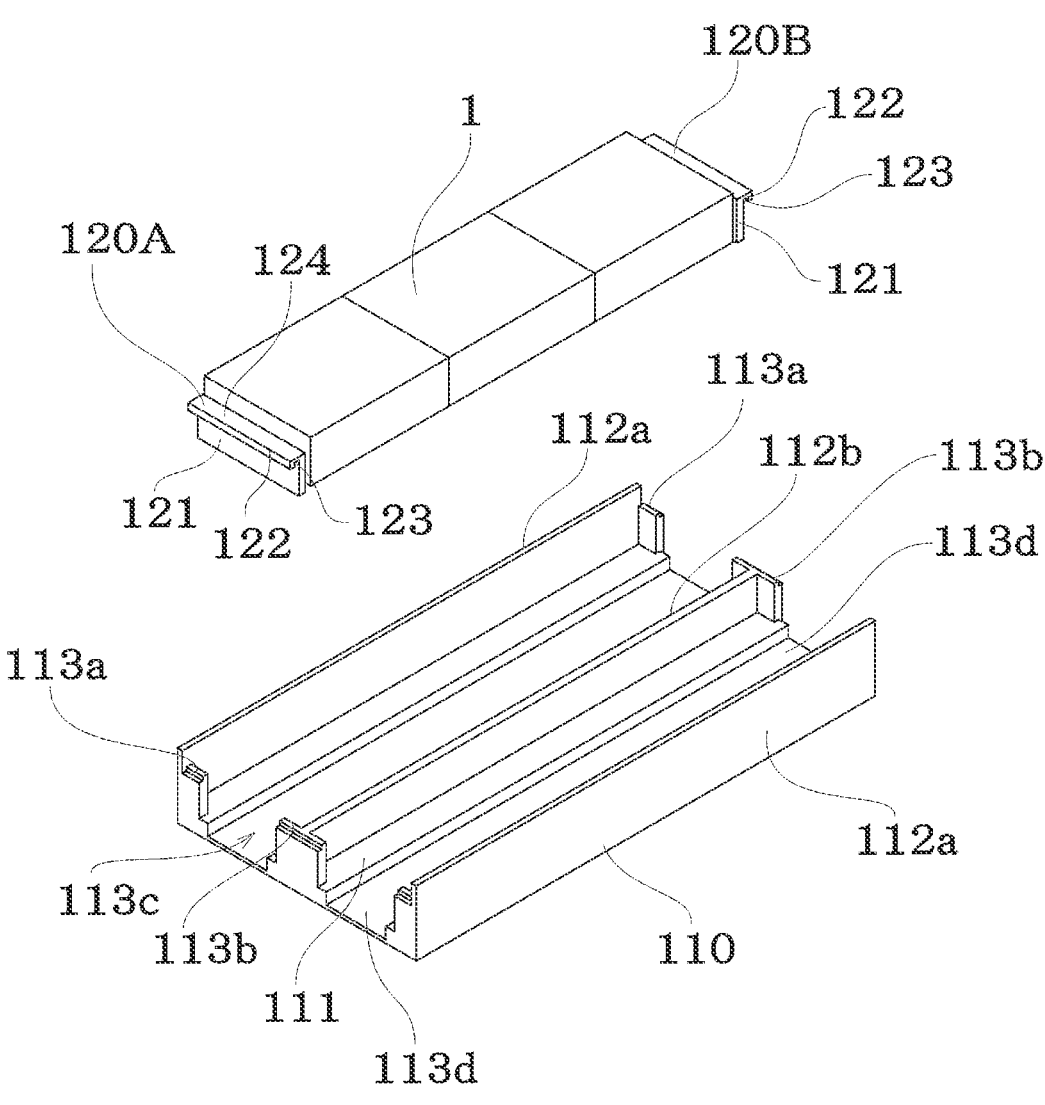
FIG. 6 illustrates a structure example (Example 2) of a battery case structural body according to the present disclosure.
Figure 9:
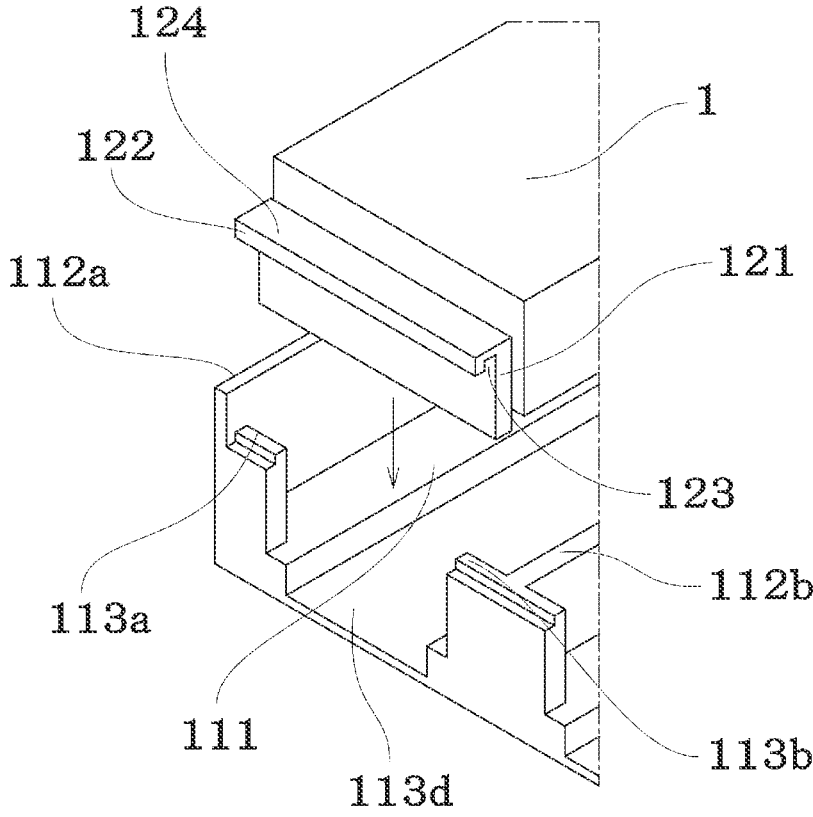
FIG. 9 illustrates an enlarged view of an end of the case body and a terminal member.

The case main body 110 has a notch-shaped end opening 113*c* with an open top by cutting out a part of the end wall in the frame located on both side ends of the battery 1 accommodated in the accommodating part 11. In Example 2, a portion of the wall of the frame is left at positions facing both ends of the battery 1 in the longitudinal direction. As shown in FIGS. 6 and 9, the case body 110 has stepped engaged portions 113*a* and 113*b* that are formed on the end walls on both sides of the end opening 113*c* and can be engaged with the engaging portions 123 of the terminal members 120A and 120B. The engaged portions 113*a* and 113*b* are each formed in a convex shape protruding upward. These engaged portions 113*a* and 113*b* are integrally formed with the case body 110 when the case body 110 is die-cast.

Figure 7:
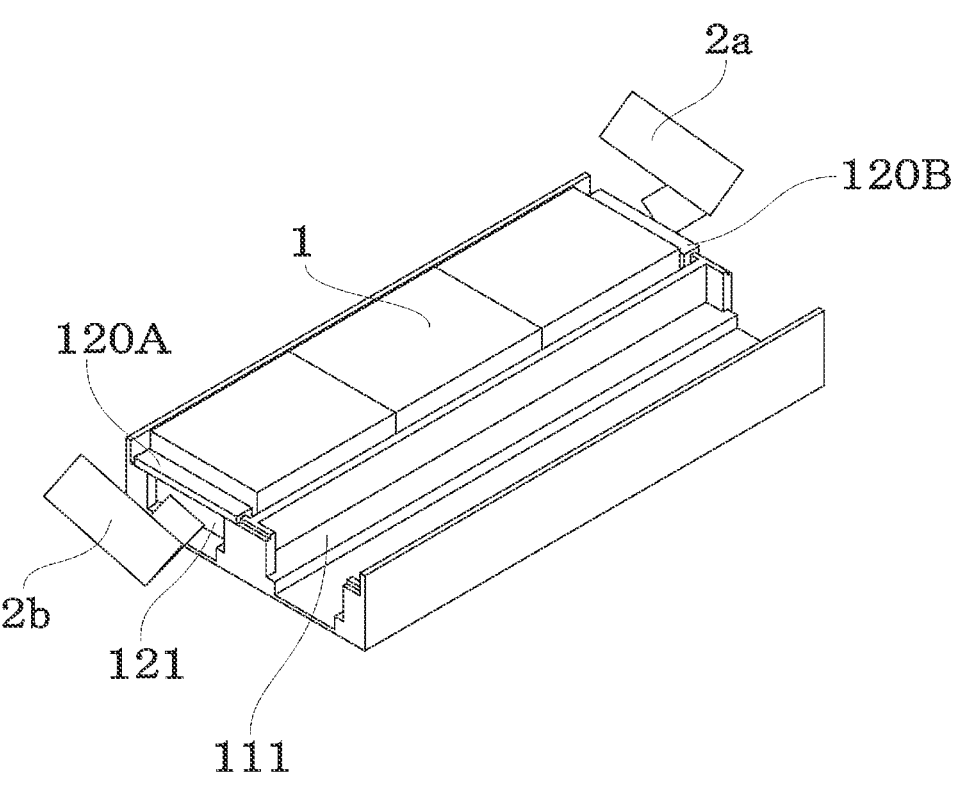
FIG. 7 illustrates a state in which a battery is held by restraining jigs, and is embedded into a case body.

To accommodate the battery 1 into the case body 110, as illustrated in FIG. 7, first, both ends of the battery 1 are held and restrained by being pressed by restraining jigs 2*a*, 2*b* via the pair of terminal members 120A, 120B. As illustrated by an arrow in FIG. 9, the battery 1 is oriented downward from above by the restraining jigs 2*a*, 2*b*, and is accommodated into the case body 110, and at the same time, the engaged parts 113*a*, 113*b* are brought to come engagement with the engaging part 123.

As a result, as shown in FIG. 7, the restraining jigs 2*a* and 2*b* can be clamped and held while being in contact with the first sidewalls 121 of the terminal members 120A and 120B on both sides. The binding load when the battery 1 is assembled in the case body 110 can be brought closer to the loading load when the battery 1 is loading into the case body 110. Also, when the battery 1 is removed from the case body 110, it is possible to prevent an excessive compressive load from being applied to the battery 1.

In Example 2, the case body 110 has a mounting portion (accommodating part) 111 on which the battery 1 is mounted and is accommodated in the case body 110. On both sides of the bottom surface of case body 110, stepped mounting portions 111 are provided at positions one step higher than the bottom surface of case body 110 and at positions along the longitudinal direction of the battery 1. The mounting portion 111 may be discontinuous in the longitudinal direction of the battery 1. By mounting the battery 1 on the mounting portion 111, a space 113 *d* can be formed below the battery 1.

Figure 8:
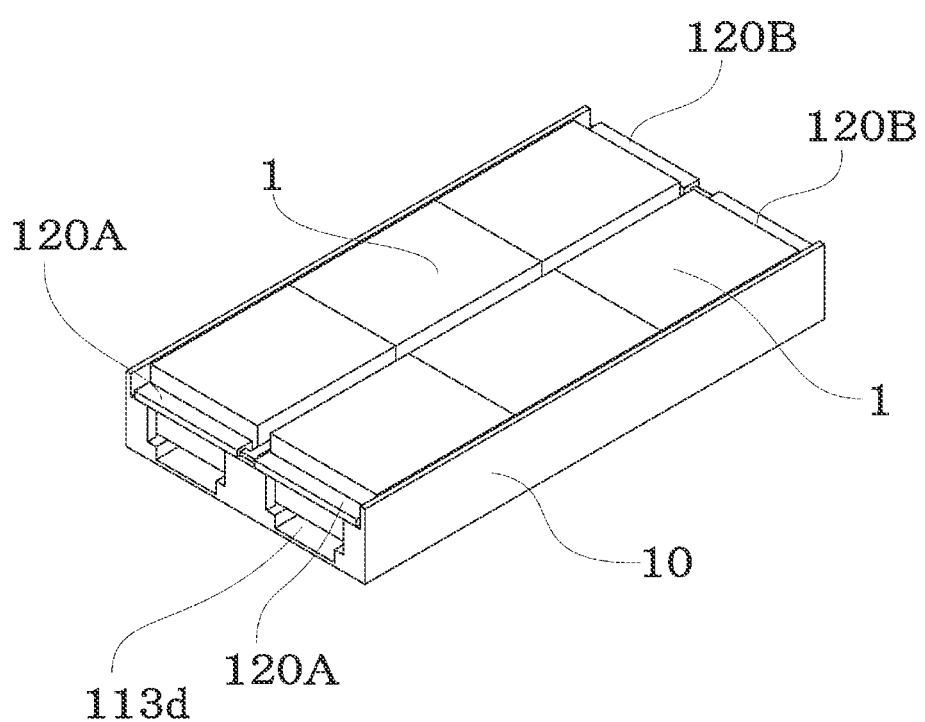
FIG. 8 illustrates an example in which battery modules in two rows are embedded in the case body.

As a result, as shown in FIG. 8, the space 113*d* communicates with the end opening 113*c*, so that the battery 1 can be cooled by, for example, flowing a coolant through the space 113*d*.

Figure 10:
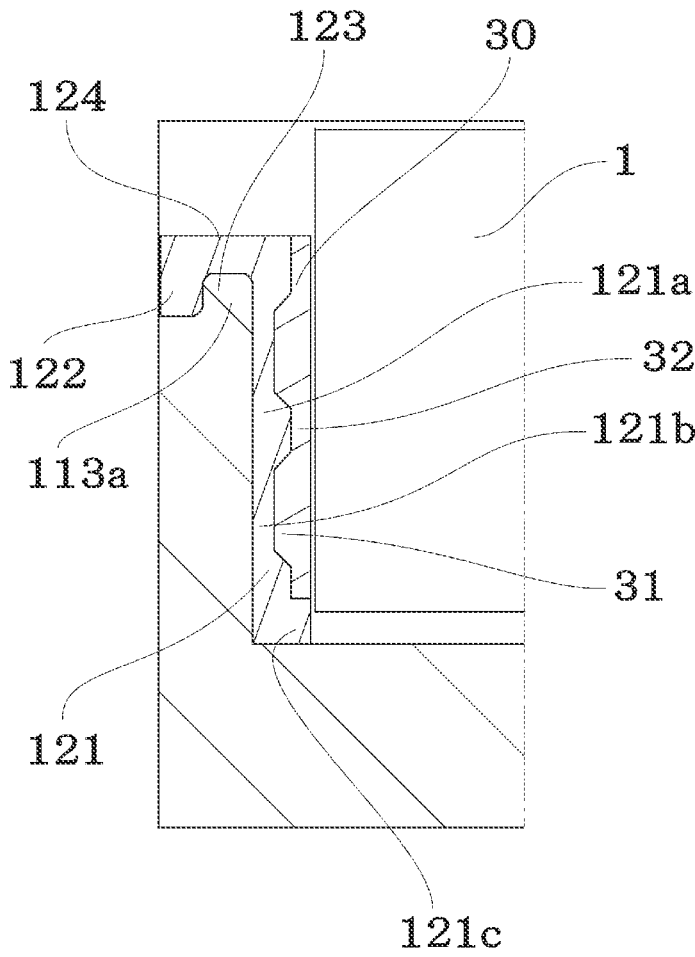
FIG. 10 illustrates an enlarged view of a terminal member (Example 3)

FIG. 10 shows Example 3 of the terminal member. In this Example 3, at the lower end of the first sidewall 121 of the terminal members 120A and 120B, a flange portion 121*c* is formed with projecting toward the battery 1. In addition, an elastic member 30 is provided between the first sidewall 121 and the end surface of the battery 1. The rigidity of the terminal members 120A and 120B is improved by forming the flange portion 121*c*.

Further, in the Example 3, by arranging the convex portion 121a and the concave portion 121b both provided in the first sidewall 121 so as to correspond to the uneven portions (32, 31) of the elastic member 30, the adhesion between the first sidewall 121 and the elastic member 30 is excellent, and it can be expected that the terminal members 120A and 120B will be prevented from dropping out and the rigidity thereof will be improved.

Figure 11:
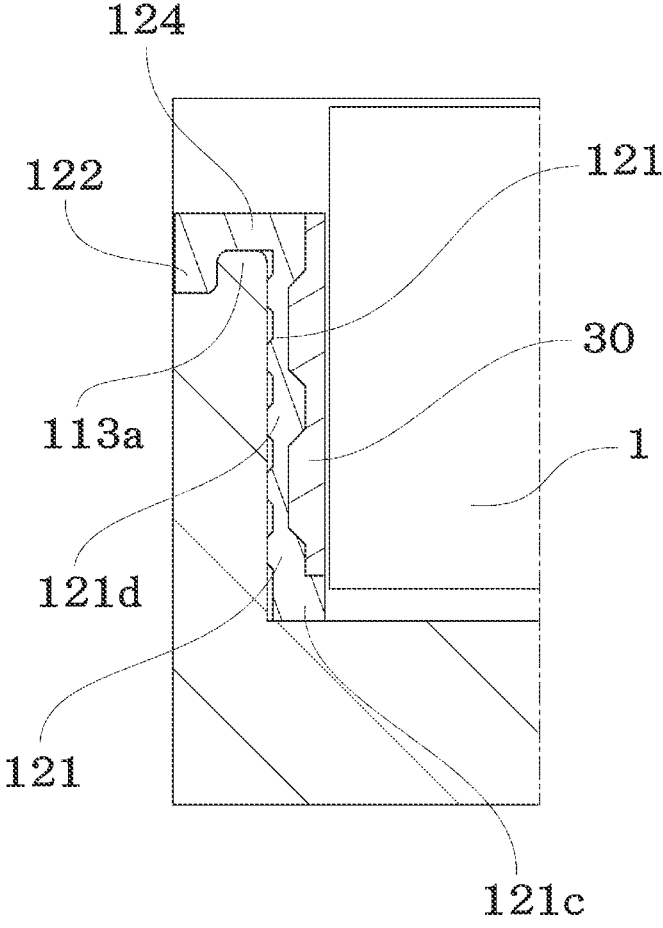
FIG. 11 illustrates an enlarged view of a terminal member (Example 4).

Example 4 of terminal members 120A and 120B is shown in FIG. 11. In this embodiment, by forming the uneven surface portion 121d on the outer side of the first sidewall 121, heat dissipation can be improved.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

The invention claimed is:

1. A battery case structural body comprising:
two terminal members arranged at both ends of a battery; and
a case body that holds the battery,
the two terminal members including two engaging parts, each of which is provided to each terminal member,
the case body including:
an accommodating part including a frame and accommodating the battery that is downwardly embedded into the frame from above;
two end openings, each of which is formed so as to cut at least an upper part of the frame and exposes at least a part of each of the two terminal members arranged at both ends of the battery accommodated in the accommodating part; and
two engaged parts engaged with the two engaging parts of the two terminal members.

2. The battery case structural body according to claim 1, wherein
each of the two end openings is formed across a width wide enough to avoid interference between the case body and jigs that sandwich, from both sides, the two terminal members arranged at both ends of the battery when the battery is loading into the case body.

3. The battery case structural body according to claim 1, wherein
each of the two engaging parts is an engaging recess having an opening facing downward, and each of the two engaged parts is an engaged projection that is engaged with the engaging recess.

4. The battery case structural body according to claim 2, wherein
each of the two engaging parts is an engaging recess having an opening facing downward, and each of the two engaged parts is an engaged projection that is engaged with the engaging recess.

5. The battery case structural body according to claim 3, wherein
each of the two engaging parts includes a first sidewall arranged at an end of the battery, a second sidewall opposed to the first sidewall via a space, and a top wall connecting the first and second sidewalls, and
the engaging recess is formed by the first sidewall, the second sidewall and the top wall.

6. The battery case structural body according to claim 4, wherein
each of the two engaging parts includes a first sidewall arranged at an end of the battery, a second sidewall opposed to the first sidewall via a space, and a top wall connecting the first and second sidewalls, and
the engaging recess is formed by the first sidewall, the second sidewall and the top wall.

7. The battery case structural body according to claim 5, wherein
the first sidewall is substantially the same length as the second sidewall, and
each of the two terminal members is an extruded member having a sectional channel shape.

8. The battery case structural body according to claim 6, wherein
the first sidewall is substantially the same length as the second sidewall, and
each of the two terminal members is an extruded member having a sectional channel shape.

9. The battery case structural body according to claim 5, wherein
the first sidewall is longer than the second sidewall, and
each of the two terminal members is an extruded member having a sectional hook shape.

10. The battery case structural body according to claim 6, wherein
the first sidewall is longer than the second sidewall, and
each of the two terminal members is an extruded member having a sectional hook shape.

11. The battery case structural body according to claim 3, wherein
the case body is formed of a casted member, and the casted member is integrally formed with the engaged projections.

12. The battery case structural body according to claim 4, wherein
the case body is formed of a casted member, and the casted member is integrally formed with the engaged projections.

13. The battery case structural body according to claim 1, wherein
an elastic member is interposed between the battery and at least one of the two terminal members.

14. The battery case structural body according to claim 13, wherein
the at least one of the two terminal members is formed with a pressing member that locally presses the elastic member.

15. The battery case structural body according to claim 1, wherein
on both sides of the bottom surface of the case body, stepped mounting portions are provided at positions one step higher than the bottom surface of the case body along a longitudinal direction of the battery.

* * * * *